Figures 1, 2, 3:
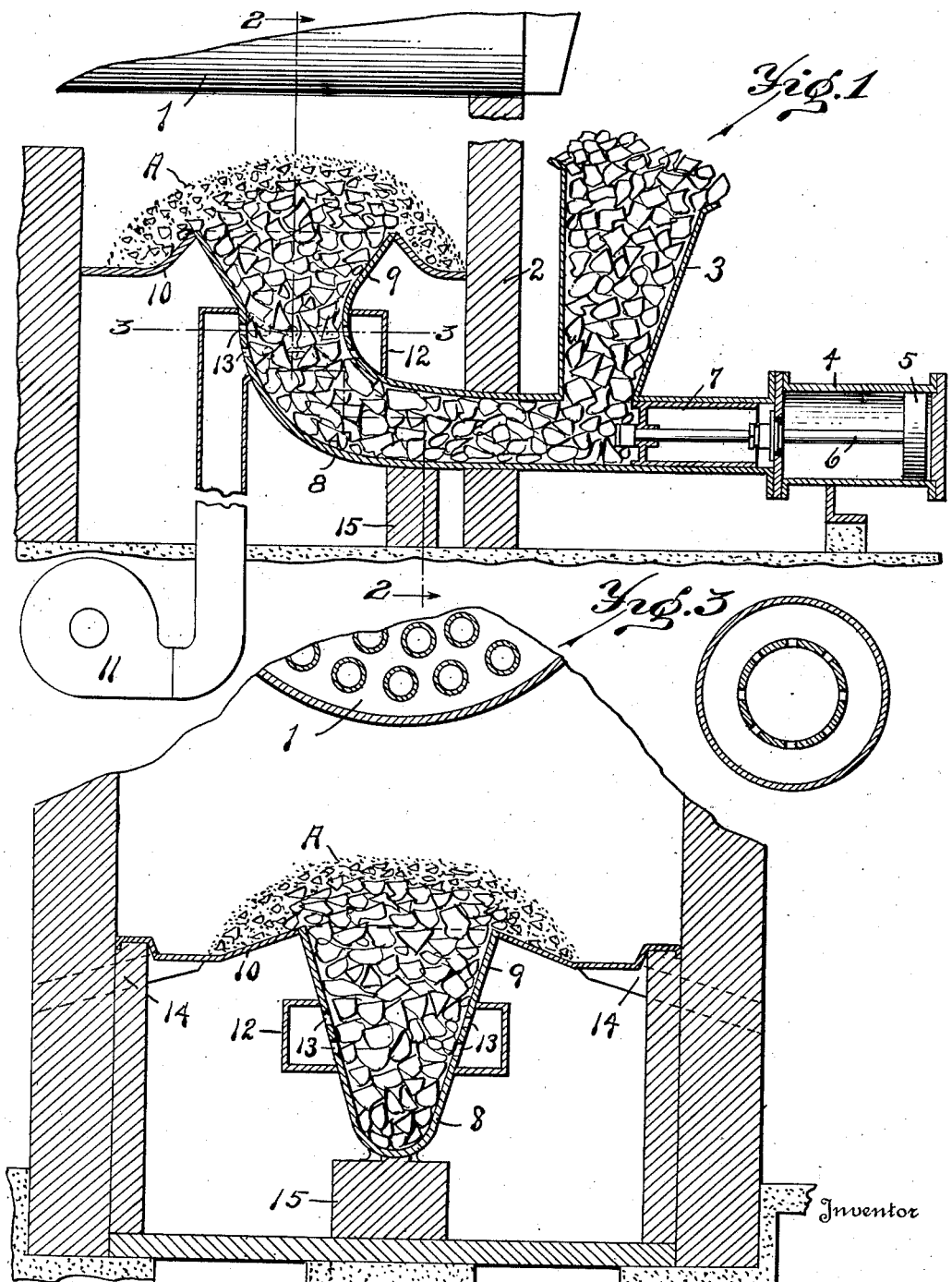

W. H. ALLEN.
PROCESS FOR MAKING PHOSPHORIC ACID.
APPLICATION FILED JUNE 17, 1920.

1,368,379. Patented Feb. 15, 1921.

Inventor
William H. Allen.
By Edward N. Pagelsen
Attorney

UNITED STATES PATENT OFFICE.

WILLIAM H. ALLEN, OF DETROIT, MICHIGAN.

PROCESS FOR MAKING PHOSPHORIC ACID.

1,368,379.  Specification of Letters Patent.  Patented Feb. 15, 1921.

Application filed June 17, 1920. Serial No. 389,614.

*To all whom it may concern:*

Be it known that I, WILLIAM H. ALLEN, a citizen of the United States, and residing at Detroit, in the county of Wayne and State of Michigan, have invented a new and Improved Process for Making Phosphoric Acid, of which the following is a specification.

This invention consists in mixing in suitable proportions finely divided phosphate rock, sand and fuel such as coal or coke, and burning the fuel portion of the mixture so as to produce an incandescent reaction zone while fresh quantities of the mixture are being gradually moved up from below to this reaction zone. At this point the intense heat causes interaction between the silicon dioxid (sand) and the tricalcium phosphate (phosphate rock), the silicon dioxid combining with the calcium of the tricalcium phosphate to produce silicate of calcium and liberating phophorus pent-oxid. While there may be some reduction by the carbon of the fuel, the excess of oxygen immediately oxidizes any liberated phosphorus to produce the pent-oxid and as pent-oxid is volatile at the high temperatures produced, all of it passes along with the products of combustion. As soon as the pent-oxid meets with moisture, which occurs almost immediately, because of the hydrocarbons of the fuel and the moisture in the air, the pent-oxid becomes phosphoric acid, and can be separated from the gases by washing or by the Cottrell or other precipitation processes, preferably after these gases have been cooled by utilizing a portion of the heat of such products of combustion for making steam, evaporating brine, or other commercial purposes. The silicate of calcium formed from the interaction with other fused and unfused matter forming the slag is removed from the reaction zone from time to time.

This invention also consists in the details of the process set forth in the following specification and particularly set forth in the claims.

In the accompanying drawing, Figure 1 is a longitudinal vertical section of a furnace adapted to carry out my improved process. Figs. 2 and 3 are sections on the lines 2—2 and 3—3 of Fig. 1, respectively.

Similar reference characters refer to like parts throughout the several views.

In the drawing is represented a well known steam boiler 1 and a front wall 2 before which is placed a hopper 3 to receive the prepared mixture, a cylinder 4 with its piston 5, piston rod 6 and the ram 7 in the outer end of the conduit 8. The inner end 9 of this conduit turns up to the retort 10 and its upper end flares so that there will be a large zone A of combustion and incandescence. The structure described is well known and is a boiler provided with an "underfeed" stoker.

In order to control the fire and the character of the reaction zone, I provide a jacket 12 around the conduit 8 near the retort 10 and connect it to an air blower 11 of any convenient type. Holes 13 are formed in the conduit of any desired size and in any desired number. The conduit may be supported in any desired manner, a block 15 being shown.

As in "underfeed" stoker furnaces, the mixture of fuel, sand and rock is pushed rearwardly and upwardly to the zone of reaction where part of the carbon of the fuel may reduce the liberated phosphor pent-oxid, which probably almost immediately combines to form phosphoric and hydrid and phosphoric acid. The fuel portion of the mixture is in excess of that required to properly heat the rock and sand and reduce the pent-oxid and the excess heat resulting from the combustion of this fuel may be used to generate steam in the boiler 1, evaporate brine or for other purposes. In each case the products of combustion are cooled after which they are washed to recover the phosphoric acid or passed through a stack provided with an electric precipitator of the Cottrell type, or are treated in any other desired manner. This recovery of the acid forms no part of my present invention.

The phosphate rock is crushed and mixed with the sand and the fuel and is slowly forced into the zone of reaction where the incandescent fuel causes the sand to react with the phosphate rock to form a slag which may be drawn off through passages 14, together with the ashes and other waste solids. When the crushed phosphate rock, sand and fuel are forced upward into the reduction zone as indicated in the drawings the feed is always under control and the slag flows outward from the reduction zone and has no undesired effect on the air blast and can be easily removed without disturbing the action of the furnace. This process is especially valuable as it can be carried out in most underfeed furnaces without any additional mechanism and with very little added expense except for the recovery of the phosphorus pent-oxid from the furnace gases.

The details of the apparatus form no part of the present invention, which is the process set forth in the following claims.

I claim:—

1. The process of producing phosphoric acid consisting in mixing crushed phosphate rock, sand and coke and feeding the mixture up to a highly heated reaction zone where pent-oxid of phosphorus of the phosphate rock is liberated and passes off with the other products of the combustion of the fuel.

2. The process of producing phosphoric acid consisting in mixing crushed phosphate rock, sand and coke and feeding the mixture up to a highly heated reaction zone where pent-oxid of phosphorus of the phosphate rock is liberated and passes off with the other products of the combustion of the fuel, then cooling the gases and recovering the phosphoric acid.

3. The process of producing phosphoric acid consisting in mixing crushed phosphate rock, sand and coke and feeding the mixture up to a highly heated reaction zone where pent-oxid of phosphorus of the phosphate rock is liberated and passes off with the other products of the combustion of the fuel, air being blown up through the mixture into the incandescent zone to induce more violent combustion and high temperatures.

4. The process of producing phosphoric acid consisting in mixing crushed phosphate rock, fuel and sand and feeding the mixture through a conduit upwardly into a highly heated reaction zone where the fuel burns and the minerals are recombined to liberate phosphorus compounds.

5. The process of producing phosphoric acid consisting in mixing crushed phosphate rock, fuel and sand and feeding the mixture through a conduit upwardly into a highly heated reaction zone where the fuel burns and the minerals are recombined to liberate phosphorus compounds, and in forcing air into the conduit so it may reach the interior of the incandescent zone.

WILLIAM H. ALLEN.